Feb. 3, 1931.  A. A. HORTON  1,791,315
DASHPOT FOR CALCULATING MACHINES
Filed May 12, 1927

INVENTOR
Allen A. Horton
BY
ATTORNEYS

Patented Feb. 3, 1931

1,791,315

UNITED STATES PATENT OFFICE

ALLEN A. HORTON, OF PLYMOUTH, MICHIGAN, ASSIGNOR TO BURROUGHS ADDING MACHINE COMPANY, OF DETROIT, MICHIGAN, A CORPORATION OF MICHIGAN

DASHPOT FOR CALCULATING MACHINES

Application filed May 12, 1927. Serial No. 190,722.

This invention relates to a dash pot for calculating machines.

Most calculating machines employ a dash pot for cushioning both their forward and return strokes. The forward stroke is cushioned to prevent a too sudden operation of the machine and the return stroke to prevent jar in the sudden stopping of the parts. A dash pot for this purpose usually includes a fluid receptacle containing a body of oil in which a piston operates, the piston being connected to the operating mechanism of the machine. There are by-passes or passages from one side of the piston to the other so that the oil can move in either direction only at a given rate, thereby retarding the movement of the piston. It has been found that where small dash pots are used, such as are suitable for small portable calculating machines, it is possible to jerk the handle quickly and pull the whole body of oil in the dash pot upwardly. This has two injurious effects, namely, (1) it tends to pull the oil out of the top of the dash pot thereby causing undesirable leakage and, (2) it creates a partial vacuum under the piston so that when the handle is released the piston will jerk backward quickly thereby producing an erratic and undesirable action. The present invention is devised to overcome these objections.

The object of the invention is to provide an improved dash pot for calculating machines that will work smoothly under all conditions of operation.

Other objects and advantages of the invention will hereinafter appear.

An embodiment of the invention is shown in the accompanying drawings in which

Figures 1, 2, 3, 4, 5:
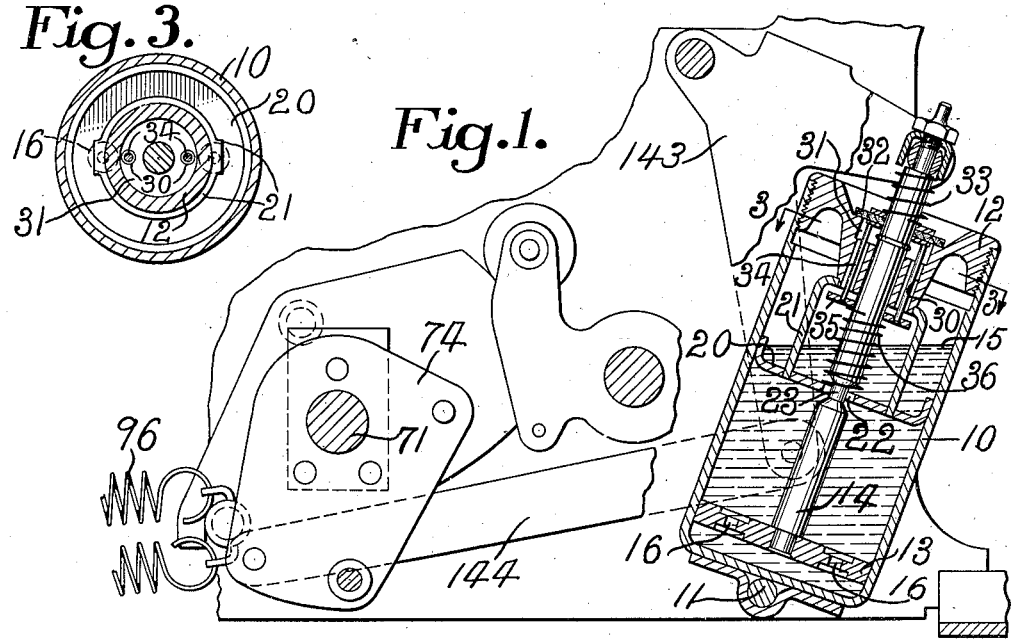
Figure 1 is a vertical section of the improved dash pot including a side elevation of portions of the operating mechanism of a calculating machine.
Fig. 2 is a cross section similar to Fig. 1 but showing the parts in different positions.
Fig. 3 is a cross section on the line 3—3 of Fig. 1.
Fig. 4 is a cross section of a modified construction.
Fig. 5 is a cross section of another modification of the dash pot.

The dash pot is illustrated in connection with a portable calculating machine of the type shown in my copending application, Serial No. 84,616 filed January 29, 1926. This machine includes a main shaft 71 to which the operating handle is connected, and a driving plate 74 actuated by the shaft 71 and connected by a link 144 to a bell crank lever 143 one of whose arms is connected to the end of the piston rod operating in the dash pot. In the normal operation of the machine the shaft 71 is rocked counter-clockwise during the forward stroke and then after it is released it is returned clockwise by the springs 96 which have been tensioned during the forward movement. During the forward stroke the piston is raised in the dash pot and the oil flows from the top to the bottom side of the piston, and, during the return stroke, the piston is moved downward allowing the oil to return from the bottom to the top side of the piston.

The dash pot comprises a cylindrical fluid receptacle 10 pivoted at 11 and enclosed at its top by a removable cap plate or closure 12. Operating within the receptacle is a piston 13 fixed to a piston rod 14 which in turn is connected to one of the arms of the bell crank lever 143. The receptacle contains a body of fluid, preferably oil, 15 and the piston is provided with a number of openings 16 forming by-passes or passages from the top to the bottom side of the piston. The number and size of these openings is such as to permit the oil to pass from one side of the piston to the other at a rate such as to give the proper speed of operation to the calculating machine. When a dash pot is small, a quick hard jerk of the handle may raise the piston so rapidly that there will not be time enough for the oil to flow to the bottom of the dash pot. In such event, the body of oil above the piston will be raised. This may force some of the oil out of the top of the dash pot and it tends to create a partial vacuum beneath the piston which results in unbalancing the atmospheric pressure on the two sides of the piston, tending to move it downwardly. If the handle of the machine is released while there is a partial vacuum beneath the piston, the piston will move downward so quickly as to cause a jerky operation or an undesirably quick return of the operating mechanism of the machine.

In order to prevent this action an intermediate plate 20 is provided positioned substantially midway of the length of the dash pot. In the form shown in Fig. 1, this plate is carried by a yoke-shaped supporting member 21 connected to the cover plate 12. The plate 20 fits the interior of the receptacle 10 quite closely and entirely separates the lower from the upper portion except for the opening 22 provided for the piston rod 14. The piston rod is provided with a reduced portion 23 which, when the piston rod is in normal position, is located adjacent the opening in the plate 20 so as to permit free passage of oil from the top to the lower part of the dash pot.

With this construction, if the handle of the machine is given a quick jerk, the piston cannot be moved upward suddenly because the plate 20 prevents upward movement of the body of oil above the piston. As soon as the piston starts to move the piston rod 14 closes the opening 22 in the plate 20. Very little oil can thus move from below the plate 20 to above it and the rate at which the piston 13 can move is determined solely by the openings 16 permitting the oil to pass from the top to the bottom side of the piston. This not only prevents the oil being forced out of the top of the dash pot but it promotes a smooth operation in that it makes impossible the creation of a vacuum underneath the piston by the sudden raising of the body of oil above the piston. The movement of the piston rod out of the space below the plate 20 is so slow that no vacuum results from this movement. It has been found in actual practice that these results are obtained.

The cover plate 12 for the dash pot is provided with a plurality of openings 30 extending from the interior of the dash pot to an oil well 31 on the top of the cover plate. These openings are to permit oil to drain from the oil well into the dash pot. The oil well 31 is closed by a valve 32 spring-pressed to position by a spring 33. This valve is connected by rods 34 with a second valve 35 which is also in spring-pressed position by a spring 36, the spring 33 being stronger than the spring 36. Whenever the valve 32 moves away from its closed position as illustrated in Fig. 2, the lower valve 35 is closed by the spring 36 so as to prevent oil from running out of the dash pot when the machine is tilted or turned upside down.

A modified form of construction is illustrated in Fig. 4 in which the plate 20 is an integral part of a cup-shaped member 40 which is held in position in the dash pot by the screw-threaded cover plate 12.

Another modification is illustrated in Fig. 5 in which the plate 20 is held in position by a cylindrical cup-shaped member 50 which in turn is carried by a supporting member 51 similar to the member 21 illustrated in Fig. 1. The piston rod 14 also carries a second piston 52 operating within the cup-shaped member 50. The top portion of this cup-shaped member acts as a baffle plate for the second piston 52 in the same manner as the plate 20 acts for the piston 13. This double piston construction permits the use of a small size dash pot for heavy duty work, as, for example, in a large machine where a large dash pot of ordinary type would be necessary but where the space for mounting such a dash pot is small. A small dash pot of ordinary construction would not be practical but by the use of the present invention a small dash pot may be employed to do the work formerly done by large dash pots.

It is to be understood that the construction shown is for purposes of illustration and that changes may be made in it without departing from the spirit and scope of the invention as defined by the claims.

I claim:

1. A dash pot for calculating machines having a closed receptacle containing fluid, a piston operating in said receptacle, there being passages from the top to the bottom of said piston, a piston rod connected to the piston and to the operating mechanism of a calculating machine, and a plate positioned above the piston for preventing sudden upward movement of the piston from raising the body of oil in the receptacle, said plate having an opening for the piston rod and said piston rod having a reduced portion which, when the piston is in normal position, is adjacent the opening in the plate.

2. A heavy duty dash pot for calculating machines comprising a fluid receptacle of small diameter, a body of fluid partially filling said receptacle, a closure for the top of the receptacle through which a piston rod operates, a plurality of pistons in said receptacle connected to said piston rod, there being passages from the top to the bottom of each piston, said piston rod being connected to the operating mechanism of a calculating machine so that when said mechanism is operated said pistons are drawn upwardly against said body of fluid, and means associated with each piston preventing its piston from bodily raising the fluid above it when an attempt is made to suddenly operate said piston rod.

3. A heavy duty dash pot for calculating machines comprising a fluid receptacle of small diameter, a body of fluid partially filling said receptacle, a closure for the top of the receptacle through which a piston rod operates, a plurality of pistons in said receptacle connected to said piston rod, there being passages from the top to the bottom of each piston, said piston rod being connected to the operating mechanism of a calculating machine so that when said mechanism is operated said pistons will be drawn upwardly against said body of fluid, and plates extending across the interior of said receptacle above each piston and below the receptacle closure for preventing said pistons from bodily raising said fluid when an attempt is made to suddenly operate said piston rod.

4. A small, heavy duty, dash pot for calculating machines having a closed fluid receptacle, a body of fluid partially filling said receptacle, a piston in the receptacle, a piston rod connected to the piston and extending through the top of the receptacle and adapted to be connected to the operating mechanism of a calculating machine, said piston being normally positioned at the lower end of said receptacle and having openings from the upper to the lower side thereof, a plate positioned above said piston and below the top of the receptacle having provision for permitting free flow of fluid from one side of the plate to the other when the piston is in normal position, and means acting automatically to obstruct flow of the fluid from one side of the plate to the other when the piston is moved from its normal position.

In testimony whereof, I have subscribed my name.

ALLEN A. HORTON.